(12) United States Patent
Padgett et al.

(10) Patent No.: US 9,659,333 B2
(45) Date of Patent: May 23, 2017

(54) DINING EXPERIENCE MANAGEMENT

(71) Applicant: Disney Enterprises, Inc., Burbank, CA (US)

(72) Inventors: John M. Padgett, Clermont, FL (US); Bart D. Butler, Celebration, FL (US); Michael G. Jungen, Belle Isle, FL (US); Bonnie J. Spivey, Celebration, FL (US); Randy Chancey, Windermere, FL (US); Lawrence Todd Heard, Clermont, FL (US)

(73) Assignee: Disney Enterprises, Inc., Burbank, CA (US)

( * ) Notice: Subject to any disclaimer, the term of this patent is extended or adjusted under 35 U.S.C. 154(b) by 255 days.

(21) Appl. No.: 13/946,987

(22) Filed: Jul. 19, 2013

(65) Prior Publication Data

US 2014/0122263 A1    May 1, 2014

Related U.S. Application Data

(60) Provisional application No. 61/719,279, filed on Oct. 26, 2012.

(51) Int. Cl.
| | |
|---|---|
| *G06Q 30/00* | (2012.01) |
| *G06Q 50/00* | (2012.01) |
| *G06Q 50/12* | (2012.01) |
| *G06Q 10/06* | (2012.01) |

(52) U.S. Cl.
CPC ........... *G06Q 50/12* (2013.01); *G06Q 10/063* (2013.01)

(58) Field of Classification Search
None
See application file for complete search history.

(56) References Cited

U.S. PATENT DOCUMENTS

| | | | |
|---|---|---|---|
| 4,222,111 A | 9/1980 | Sloan | |
| 5,262,938 A * | 11/1993 | Rapoport et al. | 705/15 |
| 6,088,681 A | 7/2000 | Coleman | |
| 6,973,437 B1 | 12/2005 | Olewicz | |
| 7,385,479 B1 | 6/2008 | Green | |
| 7,680,690 B1 * | 3/2010 | Catalano | 705/15 |
| 7,716,083 B1 | 5/2010 | Stouvenot | |
| 7,870,166 B2 | 1/2011 | Lutnick | |
| 7,953,873 B1 | 5/2011 | Madurzak | |

(Continued)

*Primary Examiner* — Fateh M Obaid
(74) *Attorney, Agent, or Firm* — Sheppard Mullin Richter & Hampton LLP

(57) ABSTRACT

The present disclosure relates to a system configured to manage a dining experience for guests at a food service establishment. In some implementations, the system may comprise one or more guest identification devices, one or more sensors, one or more host systems, and one or more processors. The system may be configured such that real-time detailed information about the food service establishment, guests of the food service establishment, food orders placed by guests of the food service establishment, table states of the tables in the food service establishment, and tasks performed by staff members is provided to the staff members of the food service establishment. The information may facilitate a unique guest experience for guests of the food service establishment wherein the guests may place a food order remotely, arrive at the food service establishment and self-select a table, and receive delivery of their food order at their selected table.

15 Claims, 9 Drawing Sheets

(56) References Cited

U.S. PATENT DOCUMENTS

| | | |
|---|---|---|
| 8,072,383 B1 | 12/2011 | Martin |
| 8,180,583 B1 | 5/2012 | Gossweiler |
| 8,429,088 B2 | 4/2013 | Kaplan |
| 8,441,367 B1 | 5/2013 | Lee |
| 8,576,092 B2 | 11/2013 | Levy |
| 8,588,097 B1 | 11/2013 | Ogale |
| 8,593,277 B2 | 11/2013 | Nath |
| 8,599,758 B1 | 12/2013 | Ogale |
| 8,600,816 B2 | 12/2013 | Fedor |
| 8,626,200 B2 | 1/2014 | Shaw |
| 8,660,906 B2 | 2/2014 | Woycik |
| 8,661,121 B1 | 2/2014 | Mendis |
| 8,799,083 B1* | 8/2014 | Silver ............... 705/15 |
| 2001/0025279 A1 | 9/2001 | Krulak |
| 2001/0026291 A1 | 10/2001 | Uchida |
| 2002/0026364 A1 | 2/2002 | Mayer |
| 2002/0052790 A1 | 5/2002 | Tomishima |
| 2003/0090387 A1* | 5/2003 | Lestienne et al. ....... 340/825.49 |
| 2003/0114170 A1 | 6/2003 | Rick |
| 2003/0208409 A1 | 11/2003 | Mault |
| 2003/0225731 A1 | 12/2003 | Vidgen |
| 2004/0022214 A1 | 2/2004 | Goren |
| 2004/0054592 A1* | 3/2004 | Hernblad ............. 705/15 |
| 2004/0069313 A1 | 4/2004 | DeLaquil |
| 2004/0080399 A1 | 4/2004 | Foster |
| 2004/0138929 A1 | 7/2004 | Awiszus |
| 2004/0143503 A1 | 7/2004 | Suthar |
| 2004/0158499 A1 | 8/2004 | Dev |
| 2005/0030162 A1 | 2/2005 | Stambaugh |
| 2005/0075934 A1 | 4/2005 | Knight |
| 2005/0171800 A1 | 8/2005 | Yamaguchi |
| 2007/0038727 A1 | 2/2007 | Bailey |
| 2007/0178912 A1* | 8/2007 | Baranowski ............. 455/456.2 |
| 2007/0213074 A1 | 9/2007 | Fitch |
| 2008/0042898 A1 | 2/2008 | Sharma |
| 2008/0120188 A1* | 5/2008 | Mobley et al. ............. 705/15 |
| 2008/0248801 A1 | 10/2008 | Fletcher |
| 2008/0279300 A1 | 11/2008 | Walker |
| 2009/0024456 A1* | 1/2009 | Risnoveanu et al. ........... 705/11 |
| 2009/0076920 A1 | 3/2009 | Feldman |
| 2009/0093259 A1 | 4/2009 | Edge |
| 2009/0112377 A1* | 4/2009 | Schalla et al. ............. 701/3 |
| 2009/0191955 A1 | 7/2009 | Seelig |
| 2009/0204470 A1 | 8/2009 | Weyl |
| 2009/0222776 A1 | 9/2009 | Meers |
| 2009/0276300 A1 | 11/2009 | Shaw |
| 2009/0299857 A1 | 12/2009 | Brubaker |
| 2009/0312036 A1 | 12/2009 | Alizadeh-Shabdiz |
| 2010/0106607 A1 | 4/2010 | Riddiford |
| 2010/0120394 A1 | 5/2010 | Mia |
| 2010/0161432 A1 | 6/2010 | Kumanov |
| 2010/0179864 A1 | 7/2010 | Feldman |
| 2011/0029420 A1 | 2/2011 | Bianco |
| 2011/0093304 A1 | 4/2011 | Nielsen |
| 2011/0123964 A1 | 5/2011 | Aronis |
| 2011/0173092 A1 | 7/2011 | Werbitt |
| 2011/0178811 A1 | 7/2011 | Sheridan |
| 2011/0258058 A1 | 10/2011 | Carroll |
| 2011/0313648 A1 | 12/2011 | Newson |
| 2011/0313779 A1 | 12/2011 | Herzog |
| 2011/0318717 A1 | 12/2011 | Adamowicz |
| 2012/0136731 A1 | 5/2012 | Kidron |
| 2012/0233002 A1 | 9/2012 | Abujbara |
| 2012/0254100 A1 | 10/2012 | Grokop |
| 2012/0323707 A1 | 12/2012 | Urban |
| 2013/0085345 A1 | 4/2013 | Geisner |
| 2013/0085804 A1 | 4/2013 | Leff |
| 2013/0090959 A1 | 4/2013 | Kvamme |
| 2013/0132246 A1* | 5/2013 | Amin et al. ............. 705/34 |
| 2013/0138515 A1* | 5/2013 | Taniguchi et al. ........... 705/15 |
| 2013/0173337 A1 | 7/2013 | Evans |
| 2013/0211814 A1 | 8/2013 | Derks |
| 2013/0225199 A1 | 8/2013 | Shaw |
| 2013/0261183 A1 | 10/2013 | Bhagat |
| 2013/0262171 A1 | 10/2013 | Solodko |
| 2013/0311311 A1 | 11/2013 | Chopra |
| 2013/0317921 A1 | 11/2013 | Havas |
| 2014/0122148 A1 | 5/2014 | Padgett et al. ............. 705/7.15 |
| 2014/0122170 A1 | 5/2014 | Padgett et al. ............. 705/7.29 |
| 2014/0122263 A1 | 5/2014 | Padgett |
| 2014/0211985 A1 | 7/2014 | Polese |
| 2014/0257898 A1 | 9/2014 | Calman |
| 2014/0278645 A1 | 9/2014 | Davidson |
| 2014/0282265 A1 | 9/2014 | Shaich |
| 2014/0310651 A1 | 10/2014 | Padgett et al. ............. 715/810 |
| 2015/0043362 A1 | 2/2015 | Sankar |
| 2015/0081478 A1 | 3/2015 | Bahrami |

* cited by examiner

DINING EXPERIENCE MANAGEMENT

FIELD OF THE DISCLOSURE

This disclosure relates to a dining experience management system configured to manage a dining experience for guests at a food service establishment.

BACKGROUND

Conventionally, dining room management refers to the processes of preparing tables for guests, seating guests, delivering food orders, and providing assistance during dining where necessary. Dining room management includes clearing and/or preparing tables for the next guests. Software configured to assist a dining room staff to manage a dining room is known. Existing software is limited to tracking and visualization software that helps a staff member visualize a current status of a large dining room. The existing software relies on human input from staff members at designated entry locations. The existing software depends on close attention and monitoring by one or more of the staff members so that accurate and up to date information is input to the system. Delays in information input and inaccuracies lead to slower and less satisfying service, lower productivity, and higher costs as dining room resources and staff are deployed less efficiently.

SUMMARY

One aspect of the disclosure relates to a dining experience management system configured to manage a dining experience for guests at a food service establishment. The system may comprise guest identification devices, one or more sensors, one or more processors, and/or other components.

The guest identification devices may be associated with guests within the food service establishment who have placed food orders. The guest identification devices may include, for example, a first guest identification device associated with a first guest who has placed a first food order.

The one or more sensors may be configured to generate output signals related to locations of the guest identification devices within the food service establishment.

The one or more processors may be configured to execute computer program modules. The computer program modules may comprise an association module and/or other modules.

The association module may be configured to associate the guest identification devices with stations in the food service establishment based on the output signals of the one or more sensors. The association may facilitate delivery of the food orders to the corresponding guests such that association of the first identification device with a first station by the association module facilitates delivery of the first order to the first guest at the first station.

In some implementations, the computer program modules may include a timing module configured to determine persistence information related to the guest identification devices associated with the stations. The persistence information may be determined based on the output signals of the sensors. The persistence information may be related to a length of time the guest identification devices are associated with the stations. For example, the persistence information for the first guest identification device associated with the first station may be related to a first length of time the first guest identification device is associated with the first station.

The food orders may include party size information. The party size information may comprise information corresponding to a quantity of guest identification devices associated with a related group of guests. For example, a first party size may comprise a first quantity of guest identification devices associated with a first related group of guests.

The stations may correspond to individual tables having table seat capacities. The first station may correspond to a first table having a first table seat capacity.

In some implementations, the computer program modules may include a capacity module configured to automatically determine an available capacity in the food service establishment. The determination may be based on one or more of the table seat capacities, the persistence information, or the party size information. For example, the capacity module may be configured to automatically determine a first available capacity based on one or more of the first table seat capacity, first persistence information, or a first party size.

In some implementations, the system may include a seating capacity interface configured to display information related to the seat capacity of the tables. The capacity module may be configured to provide the seating capacity interface with an indication of whether additional guests should be permitted to enter the food service establishment based on the available capacity. The capacity module may be configured to provide a first indication of whether a second guest should be permitted to enter the food service establishment.

In some implementations, the computer program modules may include a preliminary association module configured to make a preliminary association of guest identification devices with individual tables having available seating capacity. The preliminary association may be based on the party size information, the information from the capacity module, and/or other information. The capacity module may be configured to temporarily reduce the available capacity based on the preliminary association. Responsive to the association module associating one or more of the guest identification devices with stations corresponding to one or more of the individual tables, the capacity module may be configured to revise the available capacity based on the association made by the association module. For example, the preliminary association module may be configured to make a first preliminary association of the first guest identification device with the first table. The capacity module may be configured to temporarily reduce the first available capacity based on the first preliminary association. Responsive to the association module associating the first guest identification device with the first table, the capacity module may be configured to revise the reduced first available capacity based on the association by the association module.

In some implementations, the one or more sensors may include a bridge exit reader configured to generate output signals conveying information related to guest identification devices associated with guests leaving the food service establishment. The capacity module may be configured to adjust the available capacity based on the information from the bridge exit reader. For example, the capacity module may adjust the first available capacity responsive to the first guest identification device associated with the first guest leaving the food service establishment.

The capacity module may be configured to determine available capacity based on persistence information that indicates individual tables will have available capacity in a relatively short length of time. For example, the first available capacity may be determined based on information that indicates the first table will have available capacity in a relatively short first length of time.

The capacity module may be further configured to account for breakage responsive to the association module associating the quantity of the guest identification devices with a station corresponding to an individual table having a quantity of available seats that is greater than the quantity of associated guest identification devices. For example, the capacity module may account for breakage responsive to the association module associating a first quantity of guest identification devices with the first station corresponding to the first table having a first quantity of available seats that is greater than the first quantity of guest identification devices.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
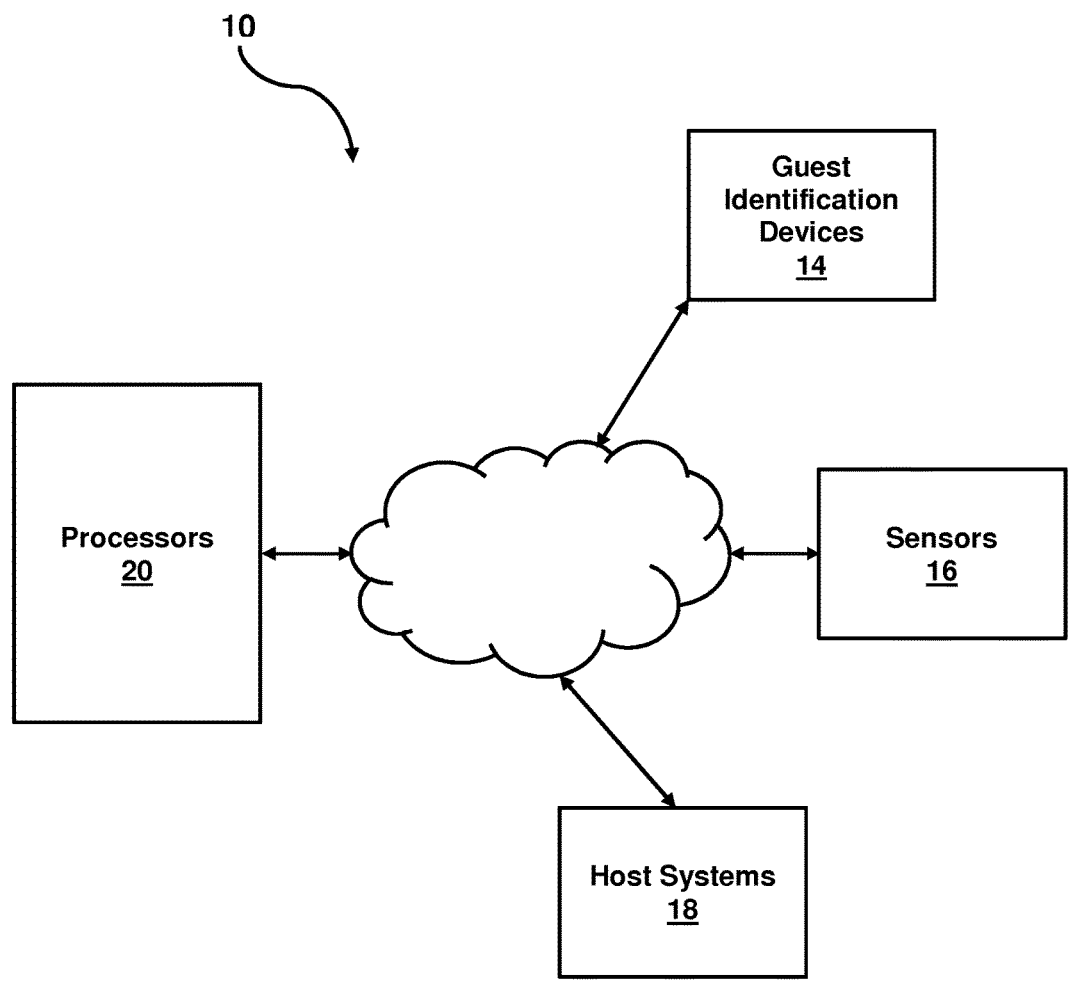
FIG. 1 illustrates a dining experience management system configured to manage a dining experience for guests at a food service establishment.

FIG. 1 illustrates a dining experience management system 10 configured to manage a dining experience for guests at a food service establishment. In some implementations, system 10 may comprise one or more guest identification devices 14, one or more sensors 16, one or more host systems 18, one or more processors 20, and/or other components. The components of system 10 may be configured to communicate such that real-time detailed information about the food service establishment (e.g., capacity information), guests of the food service establishment, food orders placed by guests of the food service establishment, table states of the tables in the food service establishment (e.g., occupied, dirty), tasks performed by staff members, and/or other information is provided to the staff members of the food service establishment.

The real-time detailed information may facilitate a unique guest experience for guests of the food service establishment. For example, the guests may place a food order remotely, arrive at the food service establishment and self-select a table, and receive delivery of their food order at their selected table.

Generation of the real-time detailed information may be accomplished by, among other things, determining proximity of guests to individual tables in the food service establishment to determine whether a table is occupied or available. The determination of whether a table is occupied and/or available may be based on additional factors such as, for example, the number of people in a related group of guests, staff visits to a table that affect the table state, and/or other factors.

The real-time detailed information may facilitate more efficient management of the food service establishment including admitting guests to the food service establishment based on a real-time capacity determinations, self-selection of tables by guests, automatic food order delivery to the self-selected tables, automatically directing staff to dirty tables that are ready to be prepared for future guests and/or other efficiencies.

The components of system 10 may be operatively linked via one or more electronic communication links. For example, such electronic communication links may be established, at least in part, via a wireless network such as the Internet and/or other networks. In some implementations, the components of system 10 may be configured to communicate directly with each other. It will be appreciated that this is not intended to be limiting, and that the scope of this disclosure includes implementations in which guest identification devices 14, sensors 16, host systems 18, processors 20, and/or other components may be operatively linked via some other communication media, or with linkages not shown in FIG. 1.

Figure 2:
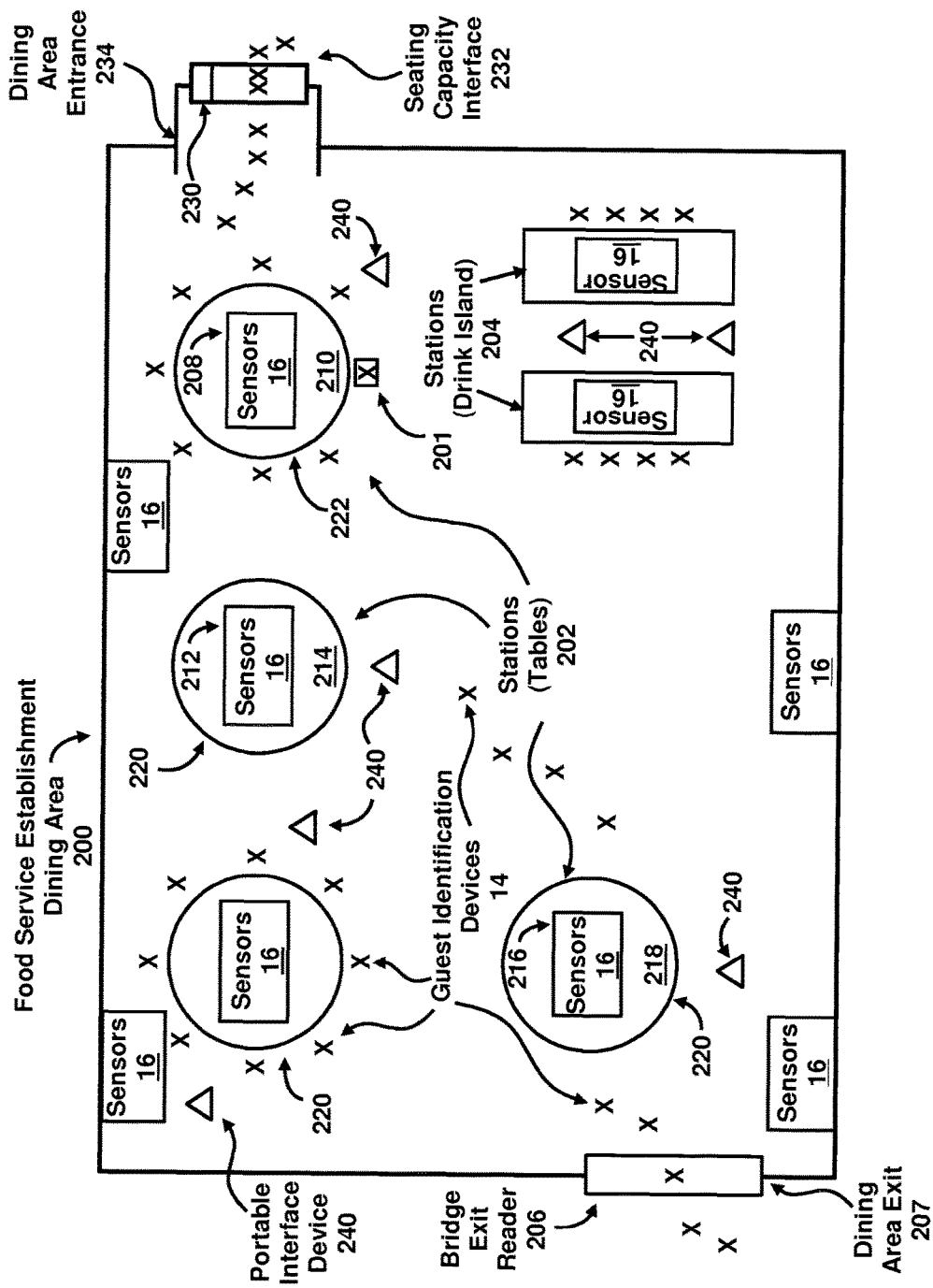
FIG. 2 illustrates a dining area of the food service establishment.

FIG. 2 illustrates a dining area 200 of the food service establishment. Guest identification devices 14 may be associated with guests within the food service establishment. Guest identification devices 14 may be configured to be detected by sensors 16 responsive to guest identification devices 14 being in proximity to sensors 16. In some implementations, guest identification devices 14 may include one or more components that may be detected by sensors 16. For example, guest identification devices 14 may include radio frequency identification (RFID) tags, components related to Wi-Fi technology, components related to GPS technology, and/or other components.

In some implementations, guest identification devices 14 may include individual guest identification devices associated with individual guests. In some implementations, guest identification devices 14 may include a single guest identification device associated with a related group of guests. The form factor of guest identification devices 14 associated with individual guests may include a wearable accessory such as a bracelet, a wristband, a necklace, and/or other form factors. The form factor of guest identification devices 14 may include a device configured to be carried, such as a card, a toy, a disc, a puck, and/or other devices. In some implementations, the components of guest identification devices 14 listed above and/or other components may be formed in a surface of guest identification devices 14. In some implementations, guest identification devices 14 may include the personal mobile devices of the guests, devices distributed by a theme park upon guests entering a theme park, and/or other electronic devices. The devices distributed by the theme park may provide interaction with and/or information about the park and/or food service establishments within the park. Guest identification devices 14 may include a first guest identification device 201 associated with a first guest.

In some implementations, such as in the theme park device distribution example and/or in the personal mobile device examples above, guests of the food service establishment may already possess guest identification devices 14 before arriving at the food service establishment. In some implementations, guest identification devices 14 may be given to the guests upon entry to the food service establishment. In some implementations, guest identification devices 14 may be associated with guests and/or with food orders placed by guests upon the guests entering the food service establishment. The associations of guest identification devices 14 with the guests and/or with the food orders may be made by processor 20, host systems 18, and/or other components of system 10.

One or more sensors 16 may be configured to generate output signals that convey information related to locations of guest identification devices 14 within the food service establishment. Sensors 16 may be disposed in a plurality of sensing locations throughout the food service establishment. The sensing locations may include locations in the tables, bars, ceiling, walls, floor, furniture, and/or other locations. Sensors 16 may be located at sensing locations at various stations 202, 204 throughout the food service establishment. The stations may include, for example, tables 202, self-service drink islands 204, a condiment island, a salad bar, and/or other stations.

In some implementations, the output signals of sensors 16 may be configured to convey information related to the relative physical positions of the sensors in the food service establishment. For example, sensors 16 may include a first sensor 208 at a first station 210, a second sensor 212 at a second station 214, and a third sensor 216 at a third station 218. Output signals from first sensor 208 may include information related to a relative physical position of first sensor 208. The output signals from second sensor 212 may include information related to a relative physical position of second sensor 212. The output signals from third sensor 216 may include information related to a relative physical position of third sensor 216.

In some implementations, sensors 16 may be configured to send outbound signals to guest identification devices 14, and/or receive inbound signals from guest identification devices 14. In some implementations, the inbound signals received by sensors 16 from guest identification devices 14 may include signal strengths related to distances between sensors 16 guest identification devices 14. The signal strengths may be stronger when guest identification devices 14 are closer to sensors 16. The signals strengths may be weaker when guest identification devices 14 are farther from sensors 16. For example, first sensor 208 at first station 210 may have a stronger signal relative to second sensor 212 at second station 214 responsive to first guest identification device 201 being closer to first sensor 208 at first station 210 than second sensor 212 at second station 214.

The one or more sensors may include a bridge exit reader 206 configured to generate output signals conveying information related to guest identification devices 14 associated with guests leaving the food service establishment. Bridge exit reader 206 may be located at and/or near an exit 207 of dining area 200.

In some implementations, at least some of the stations 202 may correspond to individual tables 220. The individual tables may have table seat capacities. For example, first station 210 may correspond to a first table 222 having a first table seat capacity. During typical operation of the food service establishment a given table may transition through periods and/or states of, for example, open, occupied, dirty, closed, and/or other states. Sensors 16 located at tables 220 may be configured to generate output signals conveying information related to the states of the tables.

Host systems 18 (shown in FIG. 1) may include one or more systems configured to manage guest entry into the food service establishment, manage food orders by guests, manage preparation of the food orders in a kitchen of the food service establishment, manage dining area tasks in dining area 200 of the food service establishment, and/or manage other activities in the food service establishment. Host systems 18 may include one or more of a point of sale (POS) system, an entry control system, a kitchen display system (KDS), a staff member interface system, and/or other host systems.

The point of sale system may be configured to accept entry of food orders from guests and manage payment for the food orders. The point of sale system may be configured to electronically send information related to the orders to the kitchen display system. The point of sale system may include cash registers 230 operated by staff of the food service establishment, self-service POS kiosks, mobile devices configured with appropriate POS hardware and/or software, and/or other components. The mobile devices may include smartphones, tablets, laptops, and/or other mobile devices. In some implementations, the mobile devices may be the personal mobile devices of the guests of the food service establishment. The guests of the food service establishment may be able to place their food orders and pay for the orders prior to arriving at the food service establishment using their personal mobile devices. In some implementations, the food orders may include party size information. The party size information may be information corresponding to a quantity of guest identification devices 14 associated with a related group of guests.

The entry control system may be configured to control guest entry into the food service establishment. The entry control system may be configured to control guest entry based on information from processors 20 (shown in FIG. 1), and/or other information. In some implementations, the entry control system may be controlled by processors 20 to allow guests into the food service establishment automatically via gates, turn styles, and/or other entry control mechanisms. In some implementations, staff of the food service establishment may control guest entry based on notifications from processor 20, the entry control system, and/or other sources that additional guests may enter the food service establishment. Processor 20, the entry control system, and/or the other sources may notify the staff via a seating capacity interface 232 located at or near the entrance 234 to the food service establishment. Seating capacity interface 232 may be configured to display information related to the seat capacity of the tables. Seating capacity interface 232 may be portable and/or embodied at a permanent location (e.g., at a kiosk, at a cash register). Processor 20 may be configured to provide the seating capacity interface with an indication of whether additional guests should be permitted to enter the food service establishment based on, for example, an available capacity in the food service establishment.

The kitchen display system (KDS) may be configured to receive the order information from the point of sale system and display order state information related to the food orders in a kitchen of the food service establishment. Order state information may comprise information related to the current preparation of the food order. The order state information may be displayed by the KDS such that kitchen staff may prepare the guest food orders and track the progress (e.g., state to state) through the kitchen.

The staff member interface system may be configured to assist one or more staff members to manage the dining experience for the guests of the food service establishment. The staff member interface system may be configured to provide staff members with information, and/or receive entry and/or selection of information related to tasks that have been performed by the staff members, tasks that will be performed by the staff members, and/or other information. The staff member interface system may be configured to provide staff members with information and/or receive entry and/or selection of information related to guest identification devices 14 associated with guests of the food service establishment, food orders placed by the guests, stations 202, 204 within the food service establishment, capacity information, and/or other information. In some implementations, the staff member interface system may include portable interface devices 240 that may be carried by staff members while the staff members are working in the food service establishment. In some implementations, each portable device 240 may comprise a staff member interface system.

Figure 3:
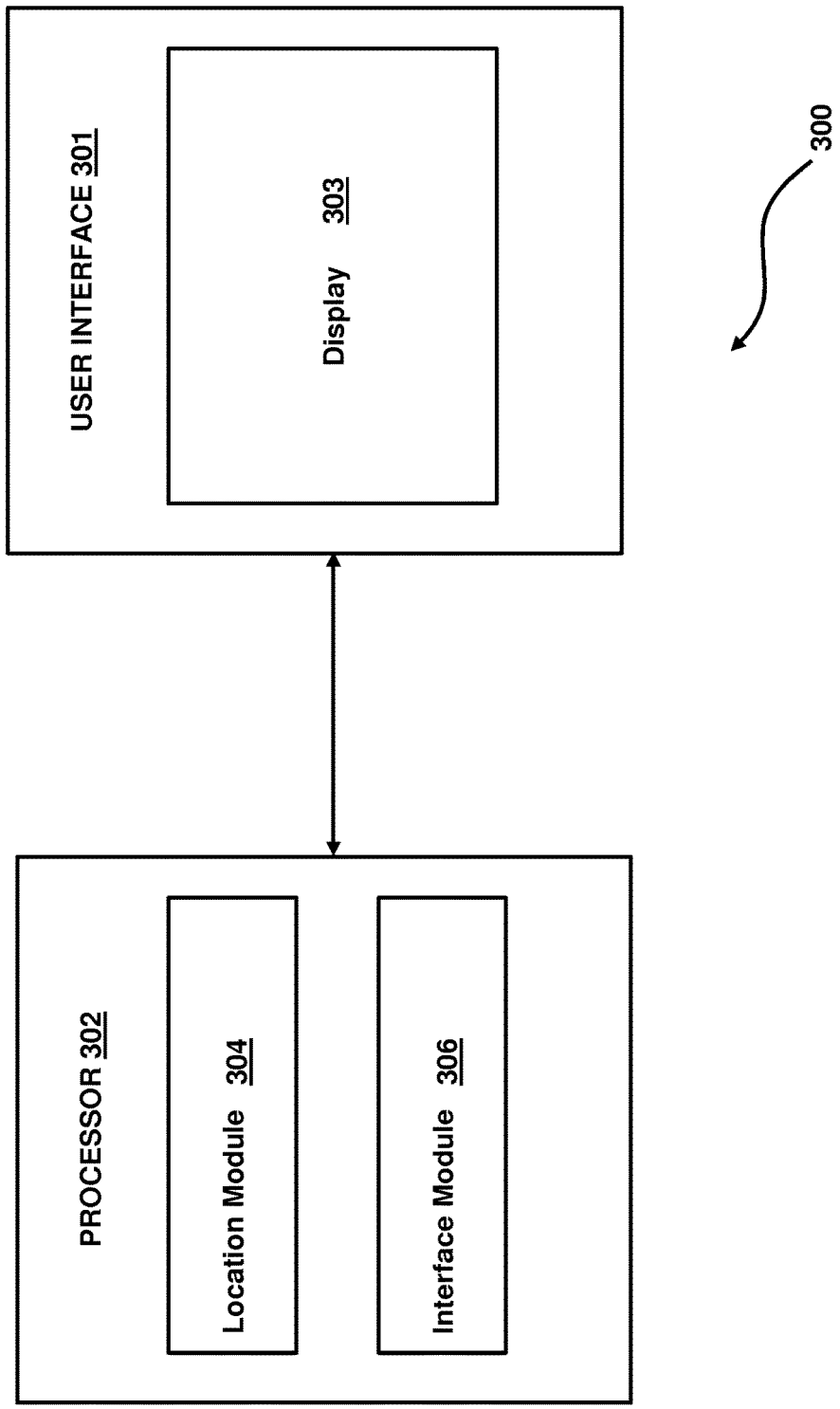
FIG. 3 illustrates a staff member interface system.

FIG. 3 illustrates a staff member interface system 300. Staff member interface system 300 may comprise a user interface 301, one or more processors 302, and/or other components.

User interface 301 may be configured to present information to and/or receive entry and/or selection of information from staff members. This enables data, cues, results, and/or instructions and any other communicable items, collectively referred to as "information," to be communicated between staff members and one or more of the POS system, the KDS, processor 20 (shown in FIG. 1), and/or other components of system 10 (FIG. 1). Examples of interface devices suitable for inclusion in user interface 22 comprise a keypad, buttons, switches, a keyboard, knobs, levers, a display screen, a touch screen, speakers, a microphone, an indicator light, an audible alarm, a printer, a tactile feedback device, and/or other interface devices. In some implementations, user interface 301 comprises a plurality of separate interfaces (e.g., a keypad and a display screen).

A display 303 of user interface 301 may be configured to present visual information to staff members. Display 303 may be configured to present visual information related to the information determined by processors 302, information entered by the staff member via user interface 301, and/or other information. By way of non-limiting example, display 303 may include one or more of a computer monitor, a touch screen display and/or other display devices.

Processor 302 may be configured to provide information processing capabilities in staff member interface system 300. In some implementations, processor 302 may comprise a plurality of processing units. Processor 302 may be configured to execute one or more computer program modules. The one or more computer program modules may comprise one or more of a location module 304, an interface module 306, and/or other modules.

Location module 304 may be configured to determine locations of staff members with respect to the stations 202, 204 (FIG. 2) in the food service establishment. Location module 304 may be configured such that the determined information related to the location of the staff member includes the location of the portable device 240 carried by the staff member.

Interface module 306 may be configured to define a graphical user interface for presentation to the staff members via display 303 of user interface 301. The graphical user interface may be configured to present information to the staff members related to tasks that have been, or are to be performed by the staff members. The graphical user interface may be configured to receive entry and/or selection of information from the staff members related to the tasks that have been, or are to be performed by the staff members. In some implementations, interface module 306 may be configured such that the graphical user interface presents information entry fields to the staff members. The information entry fields may be configured to receive entry and/or selection of information related to tasks performed by the staff members and/or tasks that will be performed by the staff members. In some implementations, the graphical user interface may include one or more views that include one or more fields configured to present information to the staff members and/or receive entry and/or selection of information from the staff members. For example, FIG. 4A illustrates a first view 400 of graphical user interface 301. First view 400 includes fields 404, 406, and 408 configured for presenting information to the staff member. First view 400 includes fields 410, 412, and 414 configured for receiving entry and/or selection of information from the staff member.

Returning to FIG. 3, interface module 306 may be configured such that the information presented to an individual staff member through the graphical user interface varies based on the location of the staff member. In some implementations, interface module 306 may be configured such that a presented order of the tasks to be performed by a given staff member changes based on the location of the staff member. For example, responsive to the given staff member being closest to first table 222 (FIG. 2), interface module may be configured such that tasks related to first table 222 are presented to the staff member first before tasks related to other tables 220. In some implementations, interface module 306 may be configured such that the fields presented to the staff member through the graphical user interface vary based on the determined location of the staff member with respect to the stations.

Figure 4:
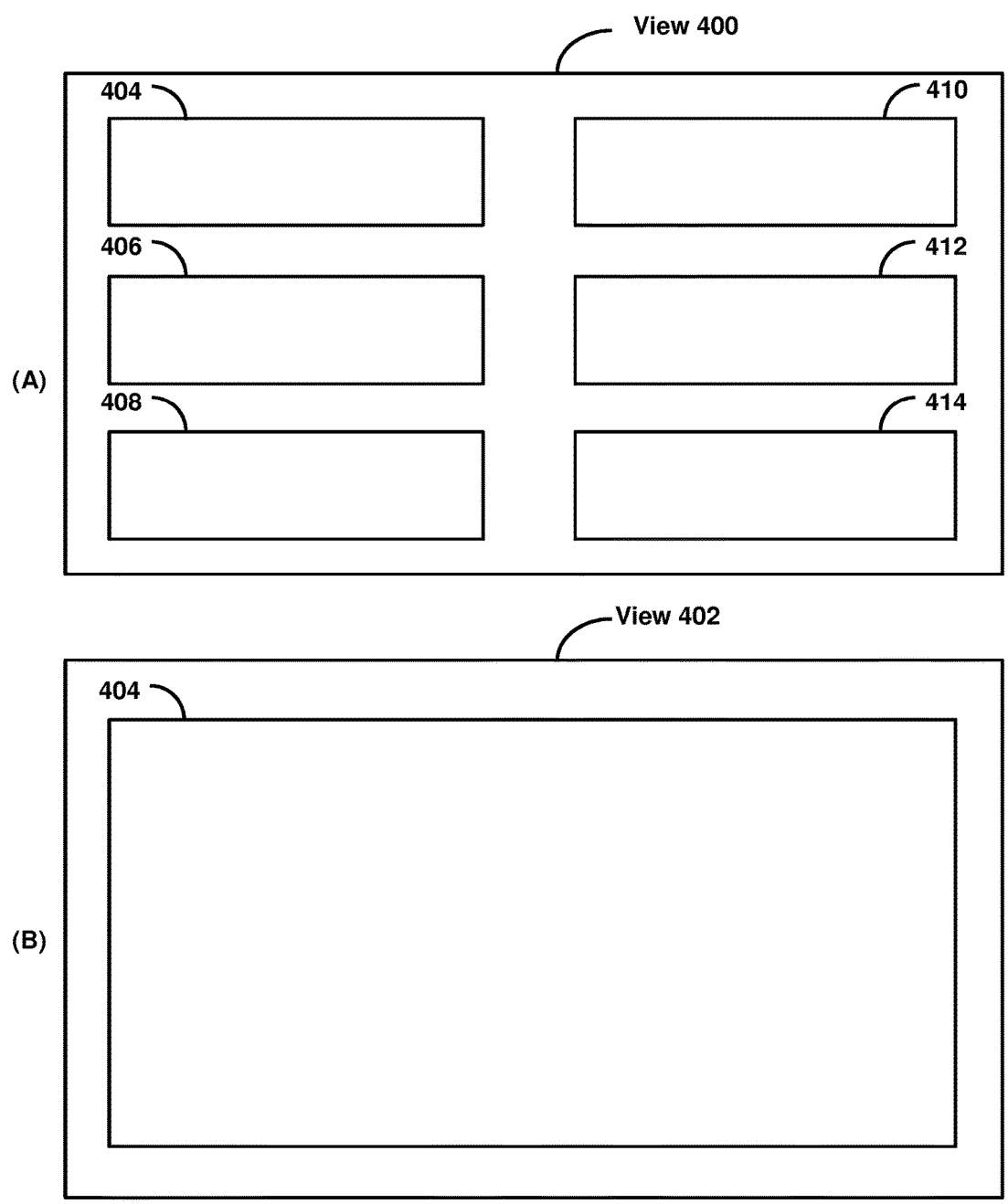
FIG. 4 illustrates two views of a graphical user interface.

For example, FIG. 4A and FIG. 4B illustrate field 404 less prominently displayed in view 400 (FIG. 4A) and more prominently displayed in view 402 (FIG. 4B). Interface module 306 (FIG. 3) may be configured such that field 404 is presented less prominently to the individual staff member responsive to the staff member being relatively far from a given station 202, 204 (FIG. 2) and more prominently responsive to the staff member being relatively close to the given station 202, 204. As another example (not shown in FIG. 4), interface module 306 may be configured such that one or more fields are not presented at all responsive to the staff member being relatively far from a given station 202, 204 and then are presented responsive to the staff member being relatively close to the given station 202, 204. As a third example (not shown in FIG. 4), interface module 306 may be configured such that one or more fields are presented but are not selectable responsive to the staff member being relatively far from a given station 202, 204 and then become selectable responsive to the staff member being relatively close to the given station 202, 204.

Returning to FIG. 3, in some implementations, the tasks that have been or will be performed by the staff members may be related to station and/or table states. The table states may comprise a current status of individual tables. The station and/or table states may comprise one or more of open, occupied, probably dirty, dirty, and/or other table states. For example, first table 222 (shown in FIG. 2) may have a first table state indicating whether first table 222 is one or more of open, occupied, probably dirty, or dirty. In some implementations, interface module 306 may be configured such that the graphical user interface displays information to the staff members related to a likelihood that first table 222 needs service. In some implementations, the information related to tasks that have been or are to be performed by the staff members may be related to a status of the food orders placed by the guests of the food service establishment. In some implementations, the staff members may have job functions. The job functions may be related to a specific set of tasks. Interface module 306 may be configured such that the graphical user interface displays the information to the staff members based on the staff member's job function. In some implementations, table state information, information related to the likelihood that a table needs service, food order status information, job function information, and/or other information may be determined by processor 20 (shown in FIG. 1).

Returning to FIG. 1, processor 20 is configured to provide information processing capabilities in system 10. As such, processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may comprise a plurality of processing units. These processing units may be physically located within the same device (e.g., a system server), or processor 20 may represent processing functionality of a plurality of devices operating in coordination.

In some implementations, processor 20 may be implemented in one or more system servers. The system servers may include electronic storage, one or more processors including processor 20, and/or other components. The servers may include communication lines, or ports to enable the exchange of information with a network and/or other computing platforms. The servers may include a plurality of hardware, software, and/or firmware components operating together to provide the functionality attributed herein to processor 20. For example, the servers may be implemented by a cloud of computing platforms operating together as a system server.

Figure 5:
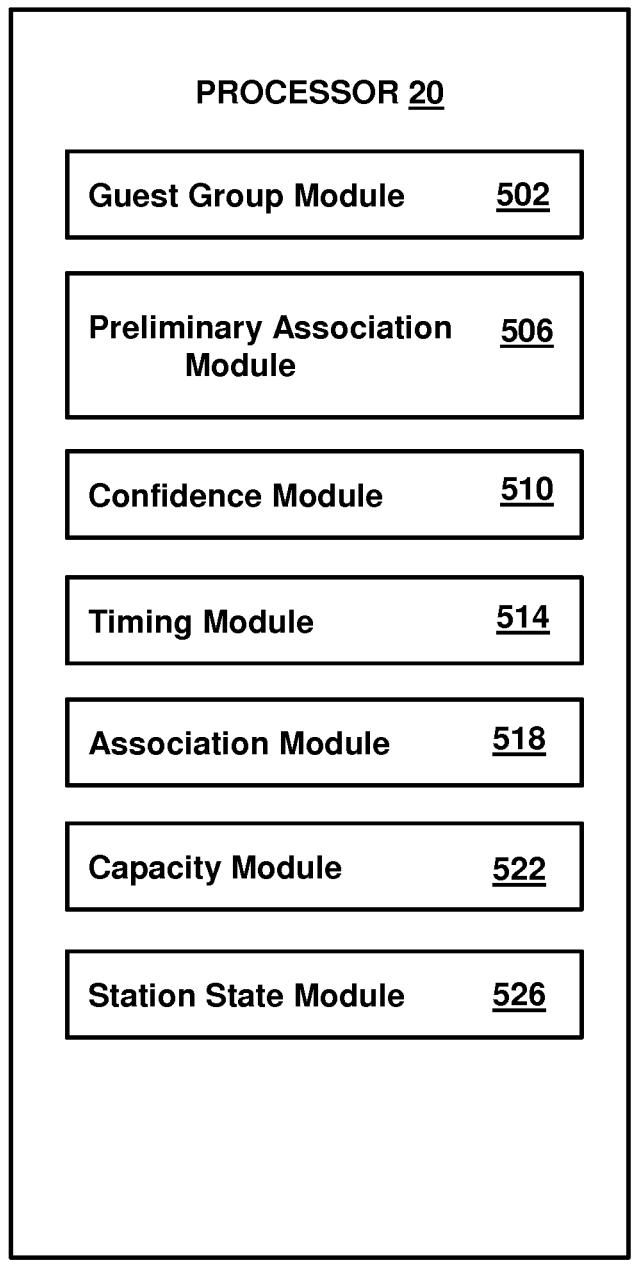
FIG. 5 illustrates computer program modules executed by a processor.

As shown in FIG. 5, processor 20 is configured to execute one or more computer program modules. The one or more computer program modules may comprise one or more of a guest group module 502, a preliminary association module 506, a confidence module 510, a timing module 514, an association module 518, a capacity module 522, a station state module 526, and/or other modules. Processor 20 may be configured to execute modules 502, 506, 510, 514, 518, 522, and/or 526 by software; hardware; firmware; some combination of software, hardware, and/or firmware; and/or other mechanisms for configuring processing capabilities on processor 20.

It should be appreciated that although modules 502, 506, 510, 514, 518, 522, and 526 are illustrated in FIG. 5 as being co-located within a single processing unit, in implementations in which processor 20 comprises multiple processing units, one or more of modules 502, 506, 510, 514, 518, 522, and/or 526 may be located remotely from the other modules. The description of the functionality provided by the different modules 502, 506, 510, 514, 518, 522, and/or 526 described below is for illustrative purposes, and is not intended to be limiting, as any of modules 502, 506, 510, 514, 518, 522, and/or 526 may provide more or less functionality than is described. For example, one or more of modules 502, 506, 510, 514, 518, 522, and/or 526 may be eliminated, and some or all of its functionality may be provided by other modules 502, 506, 510, 514, 518, 522, and/or 526. As another example, processor 20 may be configured to execute one or more additional modules that may perform some or all of the functionality attributed below to one of modules 502, 506, 510, 514, 518, 522, and/or 526.

Guest group module 502 may be configured to group guest identification devices 14 (FIG. 1, FIG. 2) associated with related groups of guests. As described above, the food orders may include party size information. The party size information may be received by guest group module 502 from the POS system. Responsive to receiving the party size information, guest group module 502 may group the guest identification devices associated with the related group of guests into a first group of guest identification devices, for example.

Preliminary association module 506 may be configured to make a preliminary association of guest identification devices 14 (FIG. 1, FIG. 2) with individual tables having available seating capacity. The preliminary association may be based on the party size information, output signals from sensors 16 (shown in FIG. 1, FIG. 2) indicating information related to open seating capacities at individual tables, and/or other information.

Confidence module 510 may be configured to determine confidence levels indicating likelihoods of guest identification devices 14 (FIG. 1, FIG. 2) being positioned at stations in the food service establishment. Confidence module 510 may be configured to determine confidence levels while guests move through the food service establishment to select a table, after guests have selected a table, and/or while guests move through the restaurant for other reasons (e.g., to fill a drink at a self-service drink island). The confidence levels may be determined based on the output signals of sensors 16 (shown in FIG. 1, FIG. 2), and/or other information. In some implementations, confidence module 510 may be configured such that the confidence levels are determined on an ongoing basis over time. In some implementations, confidence module 510 may be configured such that the confidence levels are aggregations of the ongoing confidence level determinations. Confidence module 510 may be configured to determine a first confidence level indicating a likelihood that first identification device 201 (shown in FIG. 2) is positioned at first station 210 (shown in FIG. 2), and a second confidence level indicating a likelihood first identification device 201 is positioned at the second station 214 (shown in FIG. 2).

In some implementations, confidence module 510 may be configured such that the confidence levels are determined based on the relative physical position information and/or the signal strength information from sensors 16 (discussed above related FIG. 1, FIG. 2). Confidence module 510 may be configured to triangulate the position of an individual guest identification device based on the relative physical position information and/or the signal strength information. Responsive to triangulating the position of the individual guest identification device, confidence module 510 may adjust the confidence levels based on distances between the individual guest identification device and surrounding stations.

Figure 6:
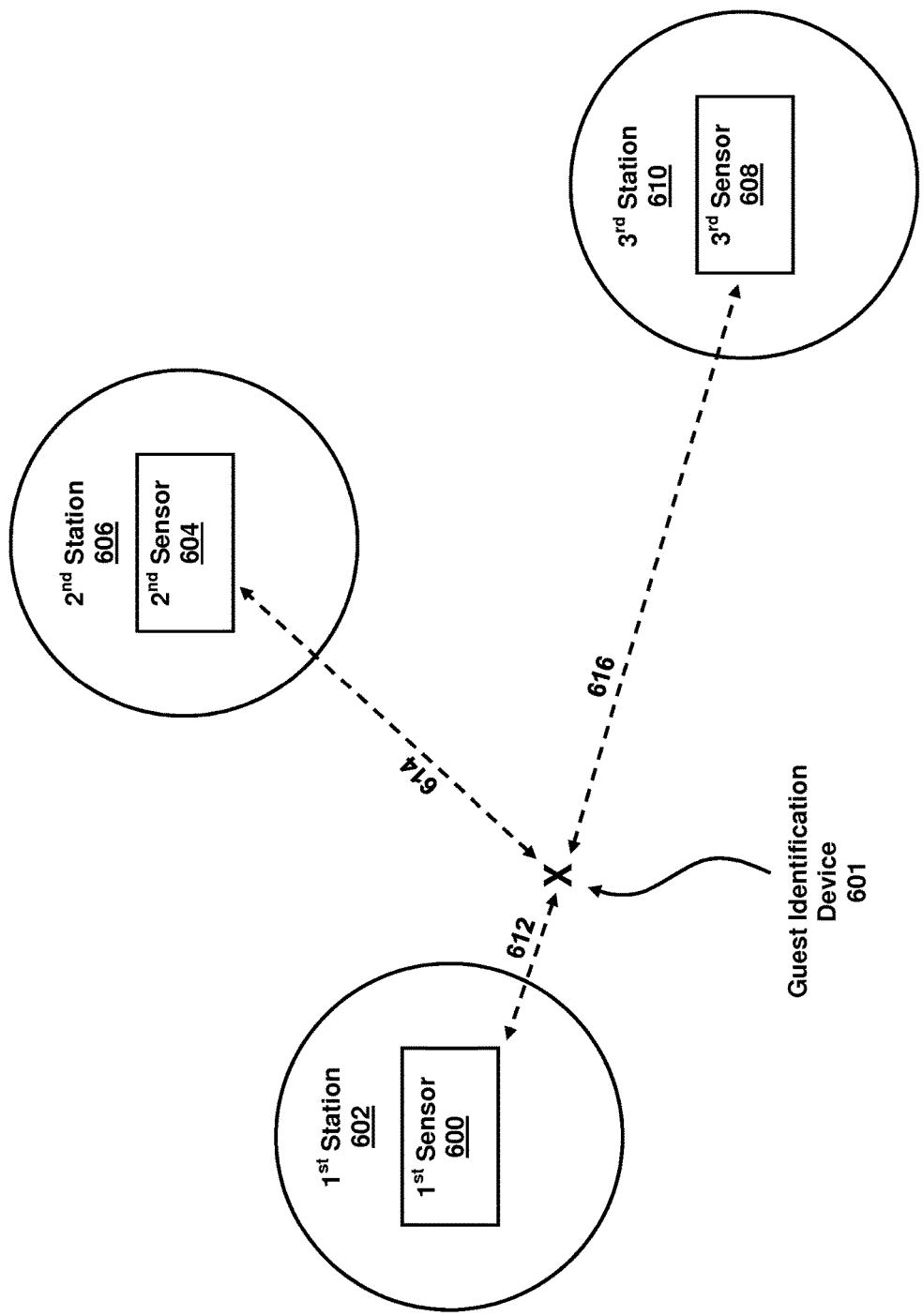
FIG. 6 illustrates a guest identification device positioned relative to three sensors and three stations.

For example, FIG. 6 illustrates a guest identification device 601 positioned relative to three sensors 600, 604, 608 corresponding to three stations 602, 606, 610. Guest identification device 601 is positioned at a first distance 612 from first sensor 600, a second distance 614 from second sensor 604, and a third distance 616 from third sensor 608. First distance 612 is shorter than second distance 614 and third distance 616. In this example, confidence module 510 (shown in FIG. 5) may increase the confidence level for guest identification device 601 at first station 602 to a higher level than the confidence levels for second station 606 or third station 610 because guest identification device 601 is closest to first station 602.

Returning to FIG. 5, in some implementations, confidence module 510 may be configured to increase confidence levels related to the grouped guest identification devices. Confidence module 510 may be configured to increase the confidence levels responsive to the guest identification devices being positioned in proximity to each other at one or more of the stations 202 (FIG. 2) in the food service establishment. For example, responsive to a family sitting together around the same table (that corresponds to a station), confidence module 510 may increase the confidence levels for the guest identification devices associated with the family members at the selected table.

In some implementations, confidence module 510 may be configured to determine confidence level thresholds. The confidence level thresholds may include a first confidence level threshold for the first confidence level and a second confidence level threshold for the second confidence level, for example. The confidence level thresholds may be pre-set, set by staff members, determined based on the output signals of the sensors, and/or determined in other ways.

Timing module 514 may be configured to determine lengths of time the confidence levels are determined by confidence module 510. Timing module may be configured to determine the lengths of time based on information from confidence module 510, and/or based on other information. The lengths of time may include a first length of time for the first confidence level and a second length of time for the second confidence level, for example.

In some implementations, confidence module 510 may be configured to determine the confidence level thresholds as a function of the lengths of time determined by timing module 514. For example, the first confidence level threshold may vary as a function of the first length of time and the second confidence level threshold may vary as a function of the second length of time. In some implementations, confidence module 510 may be configured to reduce the confidence level thresholds during the lengths of time determined by timing module 514. For example, the first confidence level threshold may be reduced during the first length of time and the second confidence level threshold may be reduced during the second length of time.

In some implementations, timing module 514 may be configured to determine over threshold times for the confidence levels. The over threshold times may indicate lengths of time the confidence levels are over the confidence level thresholds. For example, timing module 514 may be configured such that the over threshold times include a first over threshold time for the first confidence level over the first confidence level threshold and a second over threshold time for the second confidence level over a second confidence level threshold. The first over threshold time may be responsive to the first confidence level breaching the first confidence level threshold. The first over threshold time may indicate a first amount of time the first confidence level is maintained above the first confidence level threshold. The second over threshold time may be responsive to the second confidence level breaching the second confidence level threshold. The second over threshold time may indicate a second amount of time the second confidence level is maintained above the second confidence level threshold.

Association module 518 may be configured to associate guest identification devices 14 (shown in FIG. 1, FIG. 2) with guests and/or with food orders placed by guests upon the guests entering the food service establishment. The associations of guest identification devices 14 with the guests and/or with the food orders may be made by association module 518 based on the output signals of sensors 16 (shown in FIG. 1, FIG. 2), information from the POS system, information from the entry control system, information determined by one or more modules of processor 20, and/or other information. For example, association module 518 may be configured to associate first guest identification device 201 (shown in FIG. 2) with the first guest who has placed a first food order.

Association module 518 may be configured to associate guest identification devices 14 (shown in FIG. 1, FIG. 2) with stations 202 (shown in FIG. 2) in the food service establishment. The association may be based on the output signals of sensors 16 (shown in FIG. 1, FIG. 2). The association may facilitate delivery of the food orders to the corresponding guests. For example, an association of first identification device 201 (shown in FIG. 2) with the first station 210 (shown in FIG. 2) by association module 518 may facilitate delivery of the first order to the first guest at first station 210. Association module 518 may be configured to associate guest identification devices 14 with stations 202 using one or more different methods. The descriptions of the associations related to confidence level and/or time thresholds below are not intended to be limiting. The present disclosure contemplates other methods, techniques, algorithms, and/or calculations which may be used by association module 518 to associate guest identification devices 14 with stations 202 (and/or corresponding tables) in the food service establishment. The following paragraphs disclose two examples of methods that may be used to associate the guest identification devices with the stations in the food service establishment. The following examples should not be considered limiting.

In some implementations, association module 518 may be configured to associate guest identification devices 14 (shown in FIG. 1, FIG. 2) with the stations 202 (shown in FIG. 2) based on comparisons of the confidence levels with confidence level thresholds. Guest identification devices 14 may be associated with stations 202 responsive to the confidence levels breaching the confidence level thresholds. For example, first identification device 201 (shown in FIG. 2) may be associated with first station 210 (shown in FIG. 2) responsive to the first confidence level breaching the first confidence level threshold.

In some implementations, association module 518 may be configured to associate guest identification devices 14 (FIG. 1, FIG. 2) with stations 202 (FIG. 2) in the food service establishment responsive to the over threshold times breaching time thresholds. The time thresholds may include individual time thresholds for the individual guest identification devices at individual stations. For example, the time thresholds may include a first time threshold for first guest identification device 201 (FIG. 2) at first station 210 (FIG. 2) and a second time threshold for first guest identification device 201 at second station 214 (FIG. 2). First guest identification device 201 may be associated with first station 210 responsive to the first over threshold time breaching a first time threshold value. First guest identification device 201 may be associated with second station 214 responsive to the second over threshold time breaching a second time threshold value.

In some implementations, timing module 514 may be configured to determine persistence information related to the guest identification devices associated with the stations. The determination of the persistence information may be based on the output signals of sensors 16 (FIG. 1, FIG. 2), and/or other information. The persistence information may be related to a length of time guest identification devices 14 (FIG. 1, FIG. 2) are associated with stations 202 (FIG. 2). For example, persistence information for first guest identification device 201 (FIG. 2) associated with first station 210 (FIG. 2) may be related to a first length of time first guest identification device 201 is associated with first station 210.

Capacity module 522 may be configured to automatically determine an available capacity in the food service establishment. The determination may be based on one or more of the table seat capacities, the persistence information from timing module 514, the party size information from guest group module 502, and/or other information. For example, capacity module 522 may be configured to automatically determine a first available capacity based on one or more of the first table seat capacity, first persistence information, or a first party size. In some implementations, capacity module 522 may be configured to determine available capacity based on persistence information from timing module 514 that indicates individual tables will have available capacity in a relatively short length of time.

In some implementations, capacity module 522 may be further configured to account for breakage. Breakage may comprise a quantity of guests occupying a table with a quantity of available seats that is greater than the quantity of guests. Capacity module 522 may account for breakage responsive to association module 518 associating a quantity of the guest identification devices 14 (FIG. 1, FIG. 2) with a station 202 (FIG. 2) corresponding to an individual table having a quantity of available seats that is greater than the quantity of associated guest identification devices. For example, capacity module 522 may account for breakage responsive to association module 518 associating a quantity of two guest identification devices 14 with the first station 210 (FIG. 2) corresponding to the first table 222 (FIG. 2) having a quantity of four available seats (e.g., the quantity of available seats is greater than the quantity of guest identification devices).

In some implementations, capacity module 522 may be configured to adjust the available capacity based on the information from bridge exit reader 206 (FIG. 2). Capacity module 522 may adjust the available capacity responsive to guest identification devices 14 (FIG. 1, FIG. 2) associated with the guests leaving the food service establishment.

In some implementations, capacity module 522 may be configured to temporarily reduce the available capacity based on the preliminary associations by preliminary association module 506. Responsive to association module 518 associating one or more of guest identification devices 14 (FIG. 1, FIG. 2) with stations 202 (FIG. 2) corresponding to one or more of the individual tables 220 (FIG. 2), capacity module 522 may be configured to revise the temporarily reduced available capacity based on the association made by association module 518. For example, preliminary association module 506 may be configured to make a first preliminary association of the first guest identification device with the first table. Capacity module 522 may be configured to temporarily reduce the first available capacity based on the first preliminary association. Responsive to association module 518 associating first guest identification device 201 (FIG. 2) with the first table 222 (FIG. 2), capacity module 522 may be configured to revise the reduced first available capacity based on the association by association module 518.

Station state module 526 may be configured to determine the station states of the stations 202 (FIG. 2) that correspond to tables 220 (FIG. 2) in the food service establishment. The station states may comprise the current statuses of individual stations and/or corresponding tables. The station and/or table states may comprise one or more of open, occupied, probably dirty, dirty, and/or other current states. The determination of the station states may be based on the output signals of sensors 16 (e.g., locations of guest identification devices in the food service establishment), input from the staff member interface system, input from interface devices 240 (FIG. 2, FIG. 3, FIG. 4), pre-defined algorithms, and/or other information. For example, responsive to guests seating themselves and association module 518 associating the corresponding guest identification devices 14 (FIG. 1, FIG. 2) with a table 220 (FIG. 2), station state module 526 may transition the table state from "open" to "occupied". Responsive to the guests (and their corresponding guest identification devices 14) leaving the vicinity of the table they were occupying, station state module 526 may be configured such that the table transitions from "occupied" to "dirty". Station state module 526 may distinguish additional states based on a food order delivery status (e.g., delivered versus not delivered) indicated via staff interface devices 240.

In some implementations, as described above, station state module 526 may be configured to receive information indicating the delivery of the food orders (e.g., from staff member interface devices 240). Responsive to receiving the information, station state module 526 may be configured to determine lengths of time after delivery of the food orders. Station state module 526 may be configured to determine the station states for individual stations based on expirations of the lengths of time. Station state module 526 may be configured to determine the station state for an individual station to be "probably dirty" responsive to the expiration of the length of time after the food order was delivered to the table corresponding to the individual station. In some implementations, station state module 526 may be configured to determine the lengths of time after delivery of the food orders based information related to the food order (e.g., the quantity of food ordered), the party size information, information from sensors 16 (FIG. 1, FIG. 2), information related to the weather outside the food service establishment, the time of day, guest behavior probability information, wherein guest behavior probability information includes information related to a probable meal duration, data previously determined by station state module 526, and/or other information.

In some implementations, station state module 526 may be configured to control staff member interface devices 240 (FIG. 2) such that one or more staff members of the food service establishment are alerted that a station is "probably dirty" responsive to the lengths of time after delivery of the food order expiring.

In some implementations, station state module 526 may be configured to determine the station states of stations associated with guest identification devices of departed guests to be dirty based on the information from bridge exit reader 206. In some implementations, station state module 526 may be configured to control staff member interface devices 240 such that one or more staff members of the food service establishment are alerted that a station is "dirty"

responsive to the information from the bridge exit reader indicating that guest identification devices 14 (FIG. 1, FIG. 2) associated with guests formerly occupying the corresponding table have left the food service establishment.

The information conveyed by the output signals from bridge exit reader 206 may be prioritized by station state module 526 over information from other components of dining experience management system 10 (FIG. 1) when determining the station state of a station 202 (FIG. 2) in the food service establishment. Information from bridge exit reader 206 (FIG. 2) indicating that guest identification devices 14 (FIG. 1, FIG. 2) associated with guests have left the food service establishment may cause station state module 526 to change the state of the corresponding station formerly occupied by the departed guests to "dirty" regardless of other information from other sources within dining experience management system 10.

In some implementations, the preliminary associations made by preliminary association module 506, the confidence level determinations by confidence module 510, the associations by association module 518, the capacity determinations made by capacity module 522, and/or other determinations may be based at least in part on the station state information determined by station state module 526 in addition to the factors described above for each individual association and/or determination. For example, confidence module 510 may be configured to decrease confidence levels for guest identification devices 14 (FIG. 1, FIG. 2) recently in proximity to a particular station 202, 204 (FIG. 2) if the station state for the particular station is already determined to be "occupied" by station state module 526.

Figure 7:
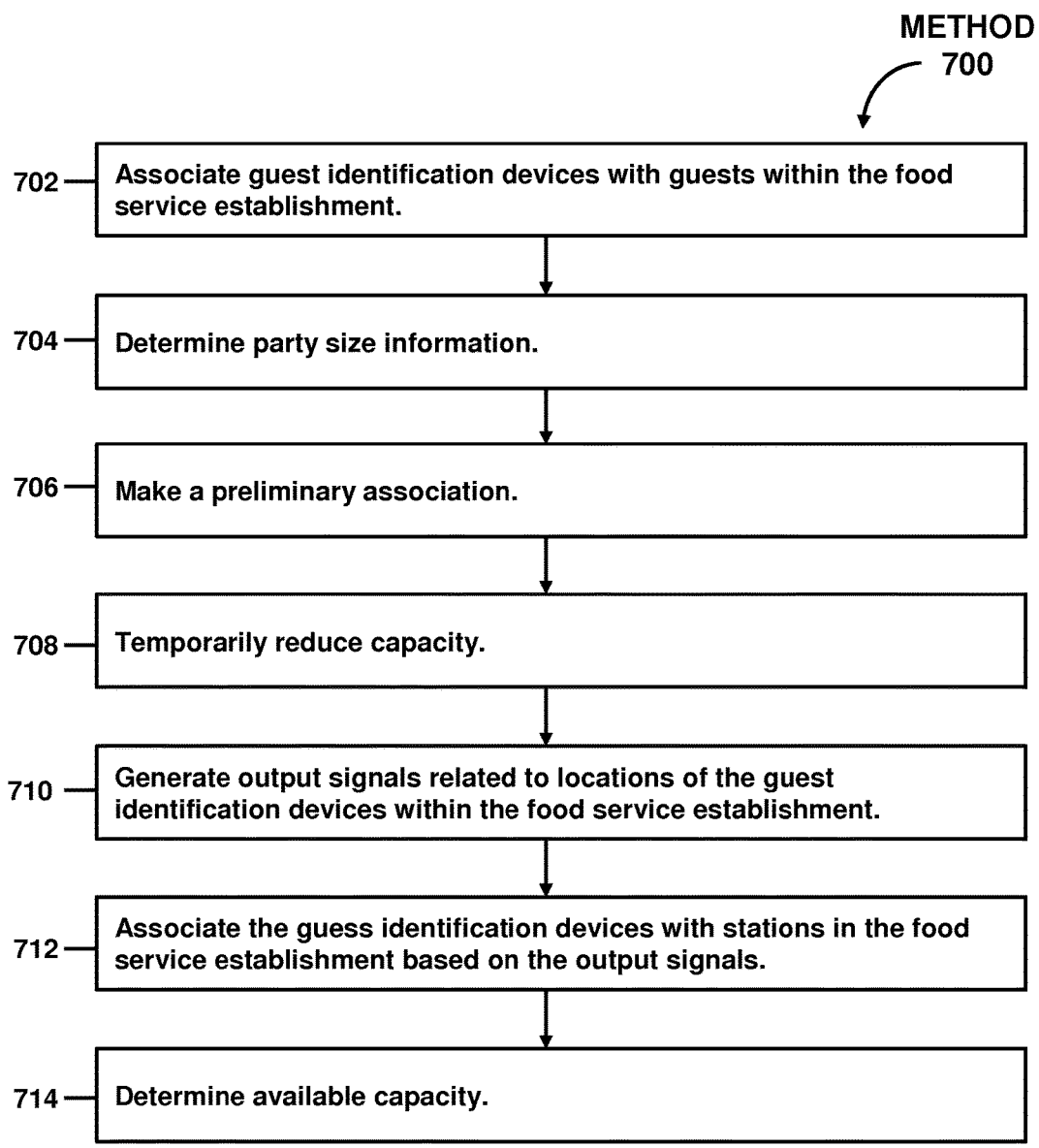
FIG. 7 illustrates a method to manage a dining experience for guests at a food service establishment.
Figure 8:
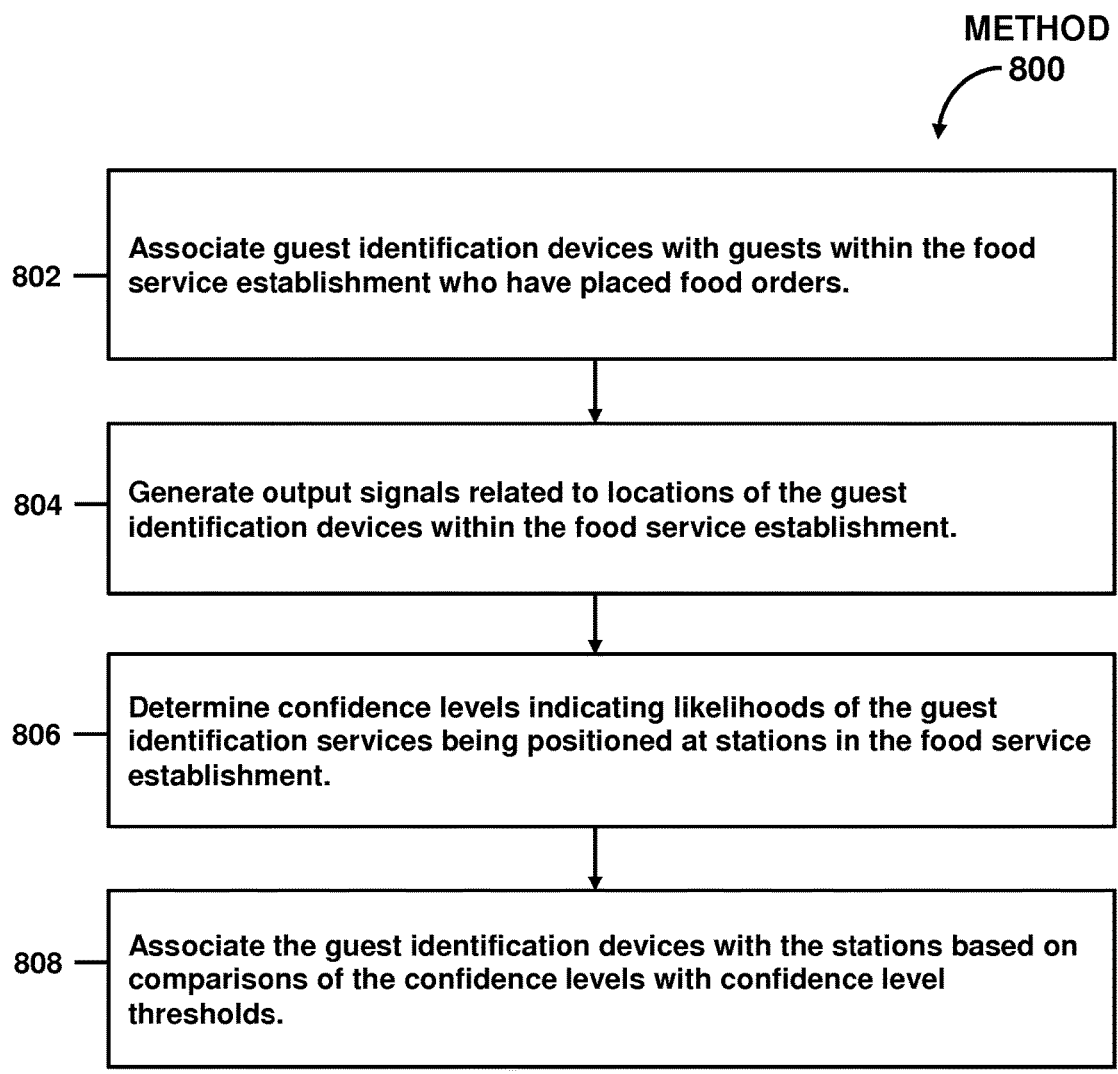
FIG. 8 illustrates a second method to manage a dining experience for guests at a food service establishment.
Figure 9:
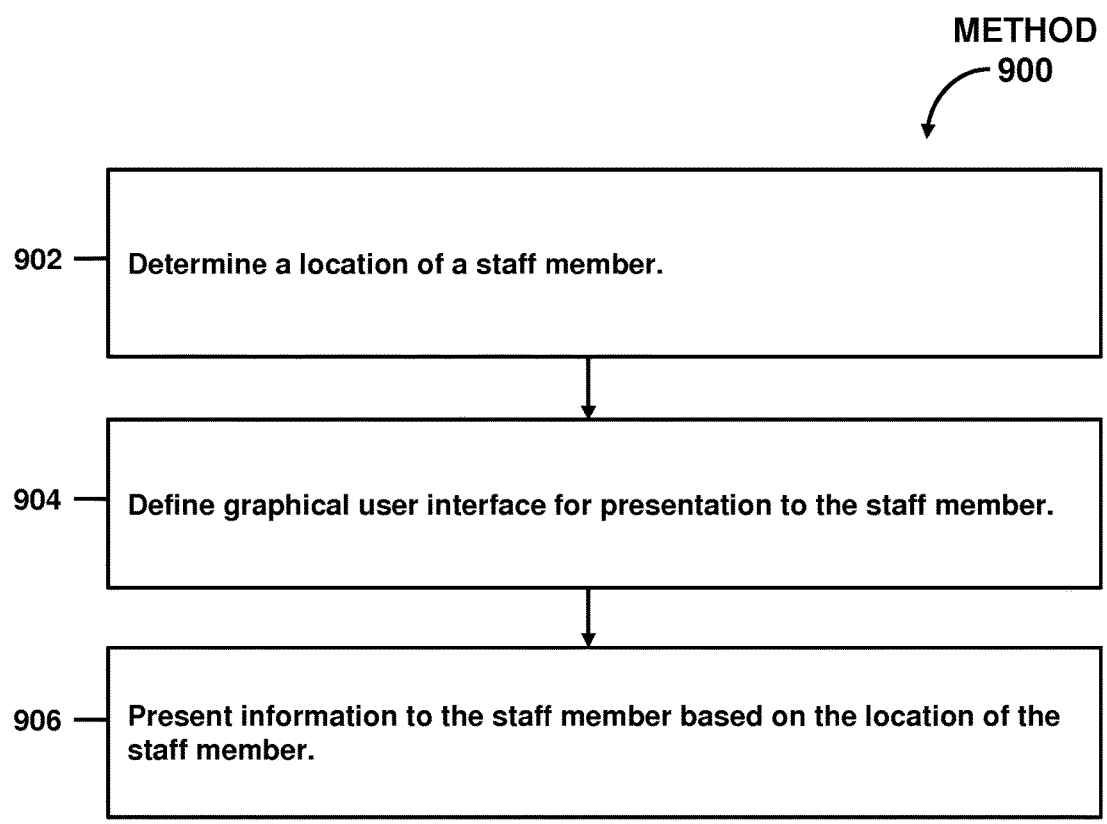
FIG. 9 illustrates a method to assist a staff member to manage a dining experience for guests at a food service establishment.

FIG. 7, FIG. 8, and FIG. 9 illustrate methods 700, 800, 900 to manage a dining experience and/or to assist a staff member to manage a dining experience for guests at a food service establishment in accordance with one or more implementations. The operations of methods 700, 800, and/or 900 presented below are intended to be illustrative. In some implementations, methods 700, 800, and/or 900 may be accomplished with one or more additional operations not described, and/or without one or more of the operations discussed. Additionally, the order in which the operations of methods 700, 800, and 900 are illustrated in FIG. 7, FIG. 8, and FIG. 9 respectively, and described below is not intended to be limiting.

In some implementations, methods 700, 800, and/or 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 800, and/or 900 in response to instructions stored electronically on an electronic storage medium. The one or more processing devices may include one or more devices configured through hardware, firmware, and/or software to be specifically designed for execution of one or more of the operations of methods 700, 800, and/or 900.

Referring to FIG. 7 and method 700, at an operation 702, guest identification devices may be associated with guests within the food service establishment who have placed food orders. The guest identification devices may include a first guest identification device associated with a first guest who has placed a first food order. Operation 702 may be performed by an association module that is the same as or similar to association module 518 (shown in FIG. 5 and described herein).

At an operation 704, party size information may be determined. In some implementations, the food orders may include the party size information. The party size information may comprise information corresponding to a quantity of guest identification devices associated with a related group of guests. For example, a first party size may comprise a first quantity of guest identification devices associated with a first related group of guests. Operation 704 may be performed by a module the same as or similar to guest group module 502 (shown in FIG. 5 and described herein).

At an operation 706, a preliminary association of the guest identification devices with stations corresponding to individual tables having available seating capacity may be made. The preliminary association may be made based on the party size information, output signals from sensors conveying information related to the seating capacity of the tables, and/or other information. Operation 706 may be performed by a module the same as or similar to preliminary association module 506 (shown in FIG. 5 and described herein).

At an operation 708, an available capacity of the food service establishment may be temporarily reduced. The available capacity may be temporarily reduced based on the preliminary association. For example, a first preliminary association of the first guest identification device with a first table may be made. A first available capacity may be temporarily reduced based on the first preliminary association. Operation 708 may be performed by a module the same as or similar to capacity module 522 (shown in FIG. 5 and described herein).

At an operation 710, output signals related to locations of the guest identification devices within the food service establishment may be generated. Operation 710 may be performed by sensors the same as or similar to sensors 16 (shown in FIG. 1 and FIG. 2, and described herein).

At an operation 712, the guest identification devices may be associated with stations in the food service establishment based on the output signals. The guest identification devices may be associated with the stations to facilitate delivery of the food orders to the corresponding guests. Association of the first identification device with a first station may facilitate delivery of the first order to the first guest at the first station. Operation 712 may be performed by an association module that is the same as or similar to association module 518 (shown in FIG. 5 and described herein).

At an operation 714, the available seat capacity of the food service establishment may be determined. Responsive to the association of the guest identification devices with stations corresponding to one or more of the individual tables, the temporarily reduced available capacity may be revised based on the association. The available capacity determination may be based on the table seat capacities, persistence information, party size information, and/or other information. Persistence information may be related to a length of time the guest identification devices are associated with the stations that correspond to the individual tables. For example, the determined available capacity may include a first available capacity based on one or more of a first table seat capacity, first persistence information, or a first party size. Operation 714 may be performed by a capacity module that is the same as or similar to capacity module 522 (shown in FIG. 5 and described herein).

Referring to FIG. 8 and method 800, at an operation 802, guest identification devices may be associated with guests within the food service establishment who have placed food orders. The guest identification devices may include a first guest identification device associated with a first guest who has placed a first food order. Operation 802 may be performed by an association module that is the same as or similar to association module 518 (shown in FIG. 5 and described herein).

At an operation 804, output signals related to locations of the guest identification devices within the food service establishment may be generated. Operation 804 may be performed by sensors the same as or similar to sensors 16 (shown in FIG. 1 and described herein).

At an operation 806, confidence levels indicating likelihoods of the guest identification devices being positioned at stations in the food service establishment may be determined. The confidence levels may be determined based on the output signals. A first confidence level may indicate a likelihood that the first identification device is positioned at a first station. A second confidence level may indicate a likelihood the first identification device is positioned at a second station. Operation 806 may be performed by a confidence module that is the same as or similar to confidence module 510 (shown in FIG. 5 and described herein).

At an operation 808, the guest identification devices may be associated with the stations. The guest identification devices may be associated with the stations based on comparisons of the confidence levels with confidence level thresholds. The first identification device may be associated with the first station responsive to the first confidence level breaching a first confidence level threshold. Operation 808 may be performed by an association module that is the same as or similar to association module 518 (shown in FIG. 5 and described herein).

Referring to FIG. 9 and method 900, at an operation 902, a location of a staff member may be determined with respect to stations in the food service establishment. Operation 902 may be performed by a location module that is the same as or similar to location module 304 (shown in FIG. 3 and described herein).

At an operation 904, a graphical user interface may be defined for presentation to the staff member. Operation 904 may be performed by an interface module that is the same as or similar to interface module 306 (shown in FIG. 3 and described herein).

At an operation 906, information related to tasks that have been, or are to be performed by the staff member may be presented to the staff member. In some implementations, the information presented to the staff member may vary based on the location of the staff member. In some implementations, presenting the information related to the tasks may comprise presenting information entry fields to the staff member. The information entry fields may be configured to receive entry and/or selection of information related to tasks performed by the staff member and/or tasks that will be performed by the staff member. In some implementations, the information entry fields may be presented to the staff member through the graphical user interface and vary based on the determined location of the staff member with respect to the stations. Operation 906 may be performed by a graphical user interface that is the same as or similar to graphical user interface 300 (shown in FIG. 3 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A dining experience management system configured to manage a dining experience for guests at a food service establishment, the system comprising:

guest identification devices associated with guests within the food service establishment who have placed food orders, wherein the food service establishment includes stations where guests are likely to be located, the guest identification devices including a first guest identification device, the first guest identification device being associated with a first guest who has placed a first food order;

one or more sensors distributed within the food service establishment, the one or more sensors being configured to generate output signals related to locations of individual ones of the guest identification devices within the food service establishment; and one or more physical processors configured by machine-readable instructions to:
automatically determine locations of individual ones of the guest identification devices within the food service establishment based on the output signals of the one or more sensors;
automatically associate individual ones of the guest identification devices with individual ones of the stations in the food service establishment based on the determined locations of individual ones of the guest identification devices and locations of individual ones of the stations in the food service establishment, individual stations corresponding to individual tables having table seat capacities, the association of individual ones of the guest identification devices with individual ones of the stations facilitating delivery of the food orders to the corresponding guests, such that the first guest identification device is automatically associated with a first station in the food service establishment, the first station corresponding to a first table having a first table seat capacity, wherein the association of the first guest identification device with the first station facilitates delivery of the first order to the first guest at the first station;
automatically determine an available capacity in the food service establishment, the automatic determination being based on one or more of the table seat capacities, persistence information, or party size information,
wherein the persistence information is related to a length of time individual ones of the guest identification devices are associated with individual ones of the stations that correspond to the individual tables, and
wherein the party size information is indicative of a party size and comprises information corresponding to a quantity of guest identification devices associated with a related group of guests,
such that the available capacity of the food service establishment is automatically determined based on one or more of the first table seat capacity, first persistence information, or a first party size; and
make a preliminary association of guest identification devices with individual tables having available seating capacity based on the party size information and the determined available capacity of the food service establishment, wherein the determined available capacity of the food service establishment is automatically reduced based on the preliminary association, and, responsive to association of one or more of the guest identification devices with stations corresponding to one or more of the individual tables, the available capacity is automatically revised based on the association, wherein in response to a first preliminary association of the first guest identification device with the first table, the determined available capacity is automatically temporarily reduced based on the first preliminary association, and responsive to an association of the first guest identification device with another table other than the first table, the temporarily reduced available capacity is automatically revised based on the association.

2. The system of claim 1, wherein the one or more physical processors are further configured by machine-readable instructions to:

determine the persistence information based on the output signals of the one or more sensors, such that the first persistence information for the first guest identification device associated with the first station is related to a first length of time the first guest identification device is associated with the first station.

3. The system of claim 1, wherein the food orders include the party size information, wherein the first party size comprises a first quantity of guest identification devices associated with a first related group of guests.

4. The system of claim 1, further comprising a seating capacity interface configured to display information related to the seat capacity of the tables, wherein the one or more physical processors are further configured by machine-readable instructions to provide the seating capacity interface with an indication of whether a second guest should be permitted to enter the food service establishment based on the available capacity.

5. The system of claim 1, wherein the one or more sensors include a bridge exit reader configured to generate output signals conveying information related to guest identification devices associated with guests leaving the food service establishment, the one or more physical processors being further configured by machine-readable instructions to adjust the available capacity based on the information from the bridge exit reader, such that the determined available capacity is adjusted responsive to the first guest identification device associated with the first guest leaving the food service establishment.

6. The system of claim 1, wherein the available capacity of the food service establishment is determined based on the persistence information that indicates individual tables will have available capacity in a relatively short length of time, such that the determined available capacity is determined based on information that indicates the first table will have available capacity in a relatively short first length of time.

7. The system of claim 1, wherein the determination of the available capacity of the food service establishment accounts for breakage responsive to a quantity of the guest identification devices associated with a station corresponding to an individual table having a quantity of available seats that is greater than the quantity of associated guest identification devices.

8. A method of managing a dining experience for guests at a food service establishment, the method being implemented in a computer system including one or more sensors distributed within the food service establishment, one or more physical processors, and storage media storing machine-readable instructions, the method comprising:

associating, by the one or more physical processors, guest identification devices with guests within the food service establishment who have placed food orders, wherein the food service establishment includes stations where guests are likely to be located, the guest identification devices including a first guest identification device, the first guest identification device being associated with a first guest who has placed a first food order;

generating, with the one or more sensors distributed within the food service establishment, output signals related to locations of individual ones of the guest identification devices within the food service establishment;

automatically determining, by the one or more physical processors, locations of individual ones of the guest identification devices within the food service establishment based on the output signals of the one or more sensors; and automatically associating, by the one or more physical processors individual ones of the guest identification devices with individual ones of the stations in the food service establishment based on the determined locations of individual ones of the guest identification devices and locations of individual ones of the states in the food service establishment, individual stations corresponding to individual tables having table seat capacities, the associations of individual ones of the guest identification devices with individual ones of the stations facilitating delivery of the food orders to the corresponding guests, including automatically associating the first guest identification device with a first station in the food service establishment, the first station corresponding to a first table having a first table seat capacity, wherein the association of the first guest identification device with the first station facilitates delivery of the first order to the first guest at the first station;

automatically determining, by the one or more physical processors, an available capacity in the food service establishment, the determination based on one or more of the table seat capacities, persistence information, or party size information;

wherein the persistence information is related to a length of time individual ones of the guest identification devices are associated with individual ones of the stations that correspond to the individual tables;

wherein the party size information is indicative of a party size and comprises information corresponding to a quantity of guest identification devices associated with a related group of guests; and wherein the determined available capacity includes a first available capacity that is automatically determined based on one or more of the first table seat capacity, first persistence information, or a first party size.

9. The method of claim 8, further comprising determining the persistence information based on the output signals, such that first persistence information for the first guest identification device associated with the first station is related to a first length of time the first guest identification device is associated with the first station.

10. The method of claim 8, wherein the food orders include the party size information, wherein the first party size comprises a first quantity of guest identification devices associated with a first related group of guests.

11. The method of claim 8, further comprising displaying information related to the seat capacity of the tables, the information related to the seat capacity of the tables including an indication of whether additional guests should be permitted to enter the food service establishment based on the available capacity, the indication including a first indication of whether a second guest should be permitted to enter the food service establishment.

12. The method of claim 8, further comprising making a preliminary association of guest identification devices with individual tables having available seating capacity based on the party size information and the available capacity information, wherein the available capacity is temporarily reduced based on the preliminary association, and, responsive to associating one or more of the guest identification devices with stations corresponding to one or more of the individual tables, revising the available capacity based on the association, the preliminary association including a first preliminary association of the first guest identification device with the first table, wherein the first available capacity is temporarily reduced based on the first preliminary association, and responsive to associating the first guest identification device with another table other than the first table, the reduced first available capacity is revised based on the association of the first guest with the association with the other table.

13. The method of claim 8, further comprising generating output signals conveying information related to individual ones of the guest identification devices associated with guests leaving the food service establishment, and adjusting the available capacity based on the leaving information such that the first available capacity is adjusted responsive to generated output signals conveying information related to the first guest identification device associated with the first guest leaving the food service establishment.

14. The method of claim 8, further comprising determining available capacity based on the persistence information that indicates individual tables will have available capacity in a relatively short length of time, such that the first available capacity is determined based on information that indicates the first table will have available capacity in a relatively short first length of time.

15. The method of claim 8, further comprising accounting for breakage responsive to associating the quantity of the guest identification devices with a station corresponding to an individual table having a quantity of available seats that is greater than the quantity of associated guest identification devices, such that breakage is accounted for responsive to associating a first quantity of guest identification devices with the first station corresponding to the first table having a first quantity of available seats that is greater than the first quantity of guest identification devices.

* * * * *